May 18, 1937.  R. P. MATTERN  2,080,621
PROCESS OF AND APPARATUS FOR PURIFYING HYDROGEN
Filed Feb. 3, 1932
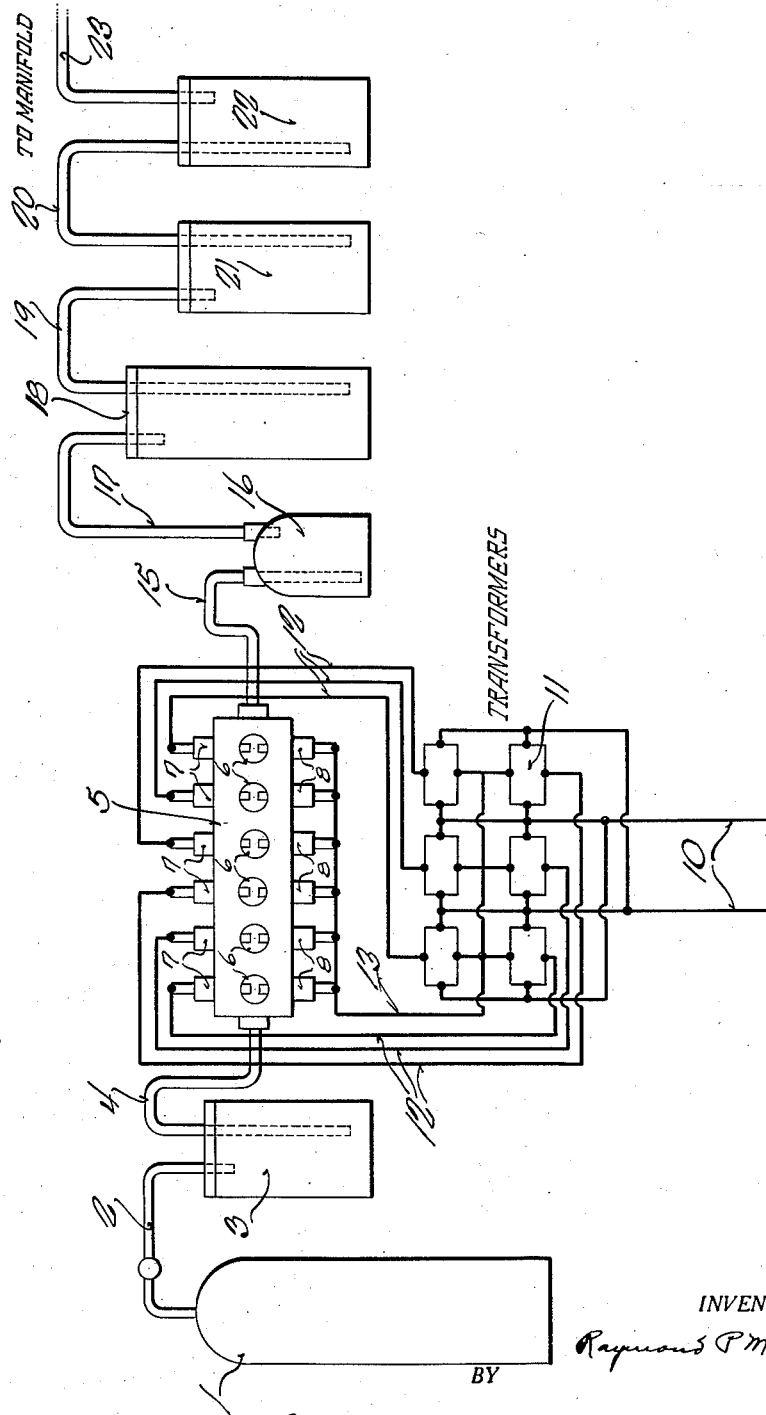
INVENTOR.
Raymond P Mattern
BY
Bettin, Hudnall, Loher, Mc Namara & Michael
ATTORNEYS Patented May 18, 1937

2,080,621

UNITED STATES PATENT OFFICE 2,080,621

PROCESS OF AND APPARATUS FOR PURIFYING HYDROGEN

Raymond P. Mattern, Elkhart, Ind., assignor to Minneapolis-Honeywell Regulator Company, Minneapolis, Minn., a corporation of Delaware Application February 3, 1932, Serial No. 590,608

7 Claims. (Cl. 204—31)

My invention relates to a process of and apparatus for producing extremely dry and substantially chemically pure hydrogen especially adapted for use as the inert, arc suppressing atmosphere in a mercury switch although also adapted for advantageous use wherever dry and substantially pure hydrogen is desirable.

One widely used type of mercury switch comprises generally an evacuated hermetically sealed container, electrodes sealed through the wall of the container, a body of mercury cooperable with the electrodes and an inert arc suppressing atmosphere of hydrogen. One form of such a mercury switch is shown and described in Patent No. 1,598,874, granted September 7, 1926, to L. A. M. Phelan. It is well known that this type of mercury switch, even where the structural integrity of its elements are preserved, will fail after being flashed or operated a certain number of times, due to the mercury separating and leaving a portion stringing or hanging between and short-circuiting the electrodes in the open position of the switch.

I have discovered that one of the causes of this failure is due to absorption by the mercury of impurities contained in the so-called commercially pure hydrogen and also present to some extent on the surfaces of and in the electrodes. The impurities of the electrodes are in the form of an oxide coating or scale on the surfaces thereof and also in the form of absorbed or occluded gases in the body or mass of the electrodes. This source of contamination of the mercury I propose to reduce to a minimum by carefully preparing these electrodes and removing all oxide or scale thereof previous to the switch being evacuated and filled with hydrogen. I have determined that the most troublesome impurities present in the so-called commercially pure hydrogen gas consists of small amounts or traces of nitrogen, oxygen and water vapor.

It is the primary object of my invention to provide a simple process of and an apparatus for purifying and drying commercially pure hydrogen so that the hydrogen, after having been subjected to the treatment proposed by my invention, will be substantially pure and substantially dry. Consequently, when used as the atmosphere in a mercury switch, it will prolong the life of the switch to a very material extent so that the switch will operate with efficiency a great many times more than a similar mercury switch containing an atmosphere of commercially pure hydrogen.

To determine the probable life of a mercury switch of any type and structure it is customary to subject a number of the switches produced by the same manufacturing process and of the same materials to the so-called "life test". The switches to be tested are selected at random so that they represent on the whole the average type of switch being manufactured. The life test consists in incorporating such a mercury switch in an electrical circuit wherein it will be subjected to a known load at a known voltage and in operating the switch at a given speed until it fails. In this way the number of times that the switch may be operated is accurately determined and this affords an indication of the comparative life of average switches of the same type and structure. When mercury switches containing an atmosphere of the so-called pure hydrogen available prior to my invention were subjected to the life test, the life of such switches varied between one thousand and two thousand operations, whereas with the same type and structure of switch containing an atmosphere of the substantially pure and dry hydrogen produced by my process the life of the switches was prolonged to an average of approximately twenty thousand operations.

I believe that these advantages result from a substantial purification and extreme drying of the hydrogen and that as a consequence the hydrogen carries no impurities or moisture to be absorbed by and contaminate the mercury. On the contrary, the hydrogen gas produced by the present invention will have the capacity of absorbing some of the impurities that may remain, notwithstanding careful manufacturing, on or in the electrodes, and on the walls of the evacuated vessel, and preclude the absorption of such minute traces of such impurities by the mercury over a long period of time.

Some of the advantages of the present process were realized in a process consisting of first freezing out any water or vapor remaining in the hydrogen and then passing the resulting hydrogen through one or more arcs struck between electrodes of metallic sodium and molybdenum. Such a process was based on the theory that any free oxygen in the hydrogen united with the sodium under the heat of the sodium arc to form sodium oxide and that any nitrogen remaining in the hydrogen united with the sodium under the same conditions to form sodium nitride. If the above reactions were final the results would be satisfactory but it was found that other reactions took place that were decidedly objectionable. The sodium under the heat of the arc not only combines with the oxygen and nitrogen as above stated but it also unites with some of the hydrogen to form sodium hydride. A large proportion of the hydrogen was lost due to this reaction. Furthermore, the sodium nitride formed is of such an unstable nature that the reaction almost immediately reverses and the compound is disassociated, releasing the elements thereof, that is, sodium and nitrogen. Finally, nitrogen under the heat of the arc and in the presence of hydrogen, combines with the latter to form ammonia. The net result of these objectionable features was that the sodium process was found very costly and that not all impurities were removed. In fact, the cost of purifying hydrogen by the sodium process is approximately thirteen times greater than it is with the present process. Furthermore, while hyrogen treated with the sodium process markedly increased the life and durability of the switch, the improvements in this respect are much enhanced by the present invention.

In carrying out the present invention commercially pure hydrogen, 99.8%, is first subjected to a treatment to remove any free water vapor. Preferably, n absorption treatment is utilized to effect the removal of the free vapor. For example, the hydrogen gas may be led through an absorption vessel containing an intimate mixture of barium oxide and glass wool. The hydrogen is then passed through an arc chamber consisting of a suitable number of spark gaps drawn between the electrodes of conventional spark plugs. In the arc chamber any uncombined oxygen present unites with hydrogen under the influence of the heat of the arc to form water vapor and any nitrogen present also unites with hydrogen to form ammonia vapor. The subsequent steps of the process consists in suitable treatment to remove the water vapor and the ammonia. One mode of carrying out these subsequent steps is to lead the gas from the arc chamber through a sulphuric acid bath which not only removes the ammonia but also some of the water vapor. The remaining water vapor may be removed by passing the gas after it leaves the sulphuric acid bath through an absorption vessel filled with a mixture of barium oxide and glass wool. Even the slightest trace of water vapor may be extracted from the gas by finally passing the gas through a vessel containing glass wool and phosphoric anhydride. After the treatment with the phosphoric anhydride and glass wool the gas is passed through a filter pad of glass wool and then into the gas manifold. A spectroscopic analysis of the gas so treated shows no trace of oxygen or nitrogen and indicates substantially pure hydrogen.

With the present invention the loss of hydrogen due to the purifying treatment is approximately ½% whereas the loss of hydrogen when purified by the sodium treatment is about 90%. This great saving is the result of the fact that the hydrogen is utilized only to combine with very small amounts of oxygen and nitrogen present and that the other steps of the process are concerned merely with the removal of the ammonia vapor and water vapor which result from combination of the hydrogen with the oxygen and the nitrogen.

Broadly, the present process consists in subjecting the commercially pure hydrogen to an absorption treatment to remove free water vapor, then subjecting the resulting hydrogen and its contained impurities to the influence of an electric arc struck between the metallic electrodes to cause any nitrogen and oxygen present as impurities in the gas to combine with the hydrogen to form ammonia and water vapor and then removing the ammonia and water vapor from the resulting gas.

In the drawing, the figure is a diagrammatic illustration of one type of apparatus which may be employed for carrying out the process of the present invention.

Referring to the drawing, the numeral 1 designates a storage tank of commercially pure hydrogen. The hydrogen in its vessel or tank is under pressure and this pressure is utilized to force the hydrogen through the other various component parts of the apparatus. A valve controlled pipe line 2 leads from the tank 1 to an absorption vessel 3 containing an intimate mixture of barium oxide and glass wool. The pipe line 2 may terminate within the vessel 3 and just below the top thereof. The pipe 4 leads from the interior of the vessel 3 and adjacent the bottom thereof to one end of an arcing chamber 5.

Any suitable number of arcs may be struck in this chamber 5. The installation illustrated contains six spark gaps, the sparks or arcs being struck between the electrodes of two rows of spark plugs designated at 7 and 8. The spark plugs have ordinary metal electrodes and are conventional except that each plug has but one electrode and the plugs are arranged in rows with the electrodes of one row in arc forming relation to the electrodes of the other row. The electrodes are electrically insulated from the body of the chamber. Sight openings or windows 6 may be provided in front of each spark gap to provide for observation or inspection of the action of the arcs. Electrical current is supplied from power lines 10 to transformers 11, the terminals of which are connected by wires 12 and 13 to the spark plugs 7 and 8. Good results may be obtained by using a potential of 5000 volts and a current of 50 milliamperes. Of course, any suitable and appropriate current and voltage values may be employed.

As the gas passes through the arc chamber the heat of the arc causes any uncombined oxygen to unite with hydrogen to form water vapor and any nitrogen present to unite with the hydrogen to form ammonia vapor. A pipe line 15 leads from the arc chamber to a vessel 16 containing sulphuric acid. The pipe line 15 is submerged in the acid so that the water and ammonia vapor and gas flowing through the pipe line discharge below the level of the acid and must pass therethrough in their travel to pipe line 17 leading to a tank or vessel 18. The sulphuric acid neutralizes and removes the ammonia vapor from the gas and also removes some of the water vapor.

The resulting gas and some water vapor then pass through the pipe 17 to the tank 18 which is connected in series with tanks 21 and 22 by pipes 19 and 20. The tank 18 contains or is filled with a mixture of barium oxide and glass wool which functions to remove water vapor while the tank 21 contains phosphoric anhydride and glass wool which functions to remove the last trace of water vapor. The vessel 22 contains glass wool and serves as a filter pad. From the filter pad or vessel 22 the pipe line 23 leads to the manifold from which the mercury switches are filled.

It is to be understood that the entire system through which the hydrogen passes during the process is hermetically sealed, all joints or connections being constructed or packed to obtain the desired hermetic sealing effect.

With the present process substantially pure and dry hydrogen may be had at a very low cost. Furthermore, the process and the apparatus by which it is carried out are both simple and practical in their nature and in their action. The hydrogen that is purified and dried by the process and apparatus embodying the present invention may be utilized with substantial advantage in mercury switches.

While preferably the process is carried out in the manner described, it is obvious that the step of absorbing the free vapors from the hydrogen before subjecting it to the action of an electric arc or spark gap may be omitted without sacrificing substantial advantages. It is also to be understood that neutralizing agents other than sulphuric acid may be employed for neutralizing the ammonia and removing it or absorbing it from the gas. Similarly, although the water vapors are preferably removed by what might be termed a two-stage treatment, the first stage utilizing barium oxide and the second stage utilizing phosphoric anhydride, it is to be appreciated that these water vapors may be removed in other ways, or by utilizing other hygroscopic substances, or by merely employing one of the two hygroscopic substances mentioned. These and other variations fairly come within the spirit of the invention and scope of the sub-joined claims.

The invention claimed is:

1. In the art of purifying commercial hydrogen, the step which consists in utilizing an arc struck between substantially non-vaporizing metallic electrodes to cause any oxygen and nitrogen present with the hydrogen to combine with a small portion of the hydrogen and form water vapor and ammonia vapor.

2. In the art of rendering substantially pure and dry, commercially pure hydrogen, the step which consists in passing a stream of hydrogen through a spark gap between substantially non-vaporizing electrodes to cause the small percentages of oxygen and nitrogen present to combine with a small portion of the hydrogen and form water vapor and ammonia.

3. The herein described process of purifying hydrogen which consists in passing the hydrogen through barium oxide to absorb any free water vapor from the hydrogen, passing the hydrogen through one or more spark gaps between substantially non-vaporizing electrodes to cause any oxygen and nitrogen present to combine with a small portion of the hydrogen and form water vapor and ammonia, passing the resulting hydrogen together with the water vapor and ammonia through a sulphuric acid bath to remove the ammonia vapor and some of the water vapor from the gas and finally absorbing all traces of water vapor from the hydrogen.

4. The herein described process of purifying hydrogen which consists in absorbing any free water vapor from the hydrogen, then passing the hydrogen through a spark gap between substantially non-vaporizing metallic electrodes to cause any oxygen and nitrogen present to combine with a small portion of the hydrogen to form water vapor and ammonia vapor, passing the resulting hydrogen together with the ammonia vapor and the water vapor through a sulphuric acid bath to remove the ammonia and some of the water vapor, and finally removing water vapor by passing the gas and such water vapor as may be present therein through mixtures of barium oxide and glass wool and phosphoric anhydride and glass wool.

5. The herein described process of purifying hydrogen which consists in subjecting the gas to the action of an electric arc struck between substantially non-vaporizing metallic electrodes to cause impurities therein to combine with hydrogen and to form water and ammonia vapors, neutralizing the ammonia vapor and removing it from the gas, and absorbing the water vapor from the gas by subjecting the gas to the action of hygroscopic substances.

6. The herein described process of purifying commercially pure hydrogen gas which consists in subjecting the gas to the action of a solid hygroscopic substance to remove the free water vapor, then subjecting the gas to the action of an electric arc struck between substantially non-vaporizing metallic electrodes to cause impurities therein to combine with some of the hydrogen and form water and ammonia vapors, neutralizing the ammonia vapor and removing it from the gas by subjecting the gas to the action of a liquid inorganic acid, absorbing the water vapor from the gas by subjecting the gas to the action of a solid hygroscopic substance, and removing any solids from the gas by passing the gas through a filter.

7. An apparatus of the character described comprising a source of supply of commercially pure hydrogen gas, a first closed vessel containing a solid hygroscopic substance and having its inlet side connected with the source of supply to remove free water vapor from the gas, an arcing chamber having its inlet side connected with the outlet side of the first vessel, means for establishing one or more arcs in the chamber between substantially non-vaporizing metallic electrodes to cause any nitrogen in the gas to combine with some of the hydrogen and form ammonia vapor and to cause any oxygen in the gas to combine with some of the hydrogen and form water vapor, a second closed vessel containing a liquid inorganic acid and having its inlet side connected with the outlet side of the chamber to neutralize and remove the ammonia vapor from the gas, a third closed vessel containing a solid hygroscopic substance and having its inlet side connected with the outlet side of the second vessel to remove the water vapor from the gas, and a fourth closed vessel containing a filter and having its inlet side connected with the outlet side of the third vessel to remove any solids from the gas whereby substantially pure and dry hydrogen is delivered from the outlet side of the fourth vessel.

RAYMOND P. MATTERN.